(12) United States Patent
Dawson

(10) Patent No.: US 7,034,846 B2
(45) Date of Patent: Apr. 25, 2006

(54) METHOD AND SYSTEM FOR DYNAMICALLY ALLOCATING A FRAME BUFFER FOR EFFICIENT ANTI-ALIASING

(75) Inventor: Thomas P. Dawson, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 10/941,234

(22) Filed: Sep. 14, 2004

(65) Prior Publication Data

US 2005/0030314 A1 Feb. 10, 2005

Related U.S. Application Data

(60) Division of application No. 10/441,630, filed on May 19, 2003, which is a continuation-in-part of application No. 09/713,070, filed on Nov. 15, 2000, now Pat. No. 6,567,099.

(51) Int. Cl.
G09G 5/00 (2006.01)

(52) U.S. Cl. .............. 345/611; 345/613; 345/629; 345/589; 345/582

(58) Field of Classification Search ........... 345/611, 345/613, 629, 589, 582
See application file for complete search history.

(56) References Cited

U.S. PATENT DOCUMENTS

| | | | | |
|---|---|---|---|---|
| 4,408,988 A | * | 10/1983 | Kaplan | 433/3 |
| 5,438,656 A | * | 8/1995 | Valdes et al. | 345/443 |
| 5,528,737 A | * | 6/1996 | Sfarti | 345/441 |
| 5,728,949 A | * | 3/1998 | McMillan et al. | 73/861.77 |
| 5,862,257 A | * | 1/1999 | Sekine et al. | 382/199 |
| 6,201,545 B1 | * | 3/2001 | Wong et al. | 345/428 |
| 6,429,877 B1 | * | 8/2002 | Stroyan | 345/611 |

* cited by examiner

Primary Examiner—Matthew C. Bella
Assistant Examiner—Mike Rahmjoo
(74) Attorney, Agent, or Firm—Steven L. Nichols; Rader, Fishman & Grauer PLLC

(57) ABSTRACT

A polygon rendering system for receiving geometric data defining a polygon in an image being generated. The polygon rendering system renders the geometric data as pixel data. The pixel data defines pixels used to display the image. The system comprises a first memory buffer for storing the pixel data. It also comprises a second memory buffer for storing additional pixel data used to render edge pixels at a higher resolution than pixels that are not the edge pixels. Edge pixels are pixels that are located on an edge of the polygon in the image. The system also comprises a display controller for outputting the pixel data in the first memory buffer to output circuitry. The polygon rendering system identifies which of the pixels are the edge pixels and the display controller updates contents of the first buffer with data based on contents of the second buffer. The additional pixel data is used to compute a color value for the edge pixels and comprises a cluster of sub-pixel data for each of the edge pixels of the image. The sub-pixel data defines a number of sub-pixels and comprises a color value for each of the sub-pixels in the cluster. The display controller computes a color value for the edge pixels based on an average of the color values for each of the sub-pixels in each cluster that corresponds to the edge pixels and stores the computed color value in a field corresponding to the edge pixels in the first buffer.

35 Claims, 12 Drawing Sheets

| | 330 | 331 | 332 | |
|---|---|---|---|---|
| | 00 | color triplet | Z-distance | 301 |
| | 11 | averaged color triplet | memory offset value | 302 |
| | 10 | color triplet | Z-distance | 303 |
| | 10 | color triplet | Z-distance | 303 |
| | 10 | color triplet | Z-distance | 303 |
| | 10 | color triplet | Z-distance | 303 |
| | 11 | averaged color triplet | memory offset value | 302 |
| | 11 | averaged color triplet | memory offset value | 302 |
| | 00 | color triplet | Z-distance | 301 |

113

| Bit Flag | Color Data | Z-Distance |
|----------|------------|------------|
| Bit Flag | Color Data | Z-Distance |
| Bit Flag | Color Data | Z-Distance |
| Bit Flag | Color Data | Z-Distance |

| | | |
|---|---|---|
| ... | ... | ... |
| ... | ... | ... |
| ... | ... | ... |
| ... | ... | ... |
| 1 | color triplet | Z-distance |
| 0 | data ignored | data ignored |
| 1 | color triplet | Z-distance |
| 1 | color triplet | Z-distance |
| 0 | data ignored | data ignored |
| 0 | data ignored | data ignored |
| 1 | color triplet | Z-distance |
| 0 | data ignored | data ignored |
| ... | ... | ... |
| ... | ... | ... |
| ... | ... | ... |
| ... | ... | ... |

302a: rows 310a–310d
302b: next four rows
110

Fig. 5a

| | | | |
|---|---|---|---|
| | 1 | color triplet | Z-distance | 500
| | 1 | color triplet | Z-distance | 501
| | 0 | data ignored | data ignored | 502
| | 0 | data ignored | data ignored | 503
| | 1 | color triplet | Z-distance | 504
| | 1 | color triplet | Z-distance | 505
| | 1 | color triplet | Z-distance | 506
302a | 0 | data ignored | data ignored | 507
| | 1 | color triplet | Z-distance | 508
| | 1 | color triplet | Z-distance | 509
| | 1 | color triplet | Z-distance | 510
| | 1 | color triplet | Z-distance | 511
| | 1 | color triplet | Z-distance | 512
| | 1 | color triplet | Z-distance | 513
| | 1 | color triplet | Z-distance | 514
| | 1 | color triplet | Z-distance | 515

| Z-Distance | Bit Flag Mask |
|---|---|
| Color Data ||
| Color Data ||
| Color Data ||
| Color Data ||
| Color Data ||
| Color Data ||
| Color Data ||
| Color Data ||
| Color Data ||
| Color Data ||
| Color Data ||
| Color Data ||
| Color Data ||
| Color Data ||
| Color Data ||

Fig. 9

| Z-distance | 1100111011111111 |
|---|---|
| color triplet | 500 |
| color triplet | 501 |
| data ignored | 502 |
| data ignored | 503 |
| color triplet | 504 |
| color triplet | 505 |
| color triplet | 506 |
| data ignored | 507 |
| color triplet | 508 |
| color triplet | 509 |
| color triplet | 510 |
| color triplet | 511 |
| color triplet | 512 |
| color triplet | 513 |
| color triplet | 514 |
| color triplet | 515 |

METHOD AND SYSTEM FOR DYNAMICALLY ALLOCATING A FRAME BUFFER FOR EFFICIENT ANTI-ALIASING

RELATED APPLICATIONS

The present application is a Divisional of, and claims priority under 35 U.S.C. § 120 from, U.S. patent application Ser. No. 10/441,630, filed May 19, 2003, which application is incorporated herein by reference in its entirety. U.S. patent application Ser. No. 10/441,630 is a Continuation-In-Part and claims priority under 35 U.S.C. § 120 of U.S. patent application Ser. No. 09/713,070, filed Nov. 15, 2000, which is now U.S. Pat. No. 6,567,099, issued May 20, 2003 by Thomas P. Dawson, entitled "Method and System for Dynamically Allocating a Frame Buffer for Efficient Anti-Aliasing". U.S. Pat. No. 6,567,099 is also incorporated herein by reference in its entirety.

TECHNICAL FIELD

The present invention relates to the field of anti-aliasing at the edges of an electronically displayed object. More particularly, the present invention relates to a method and system for dynamically allocating memory in a frame buffer to provide for additional memory to store higher resolution pixel data at the edge of an electronically displayed object to provide efficient anti-aliasing.

BACKGROUND

Electronic display devices, such as computer monitors and television sets, display images, objects and scenes, which are made up of a large number of pixels. Pixels are rectangular dots arranged in an array on the screen of the display monitor. In a color display, each pixel is defined by a particular color. The color of the pixel is usually specified as a color triplet, i.e. three numbers representing a red, green and blue component of the pixel's color. When properly arranged and viewed as a whole, the pixels form the image, object or scene being displayed. A printed image may also be formed of pixels.

Because pixels have a rectangular shape, it can be difficult to represent a diagonal or curved edge of an object without giving that edge a stair-stepped or jagged appearance. Anti-aliasing is term that describes a variety of techniques which are used to smooth the appearance of a diagonal or curved edge which must be rendered on a print medium or on an electronic display using rectangular pixels.

The basic idea behind anti-aliasing involves altering the pixels along such a curved or diagonal edge to a color between that of the color inside and outside the edge. The edge thus appears much smoother that would be the case otherwise. An example of this type of anti-aliasing is provided by black text characters (which have diagonal and curved edges) on a white background. Without anti-aliasing, diagonal edges appear jagged, like staircases, which may be noticeable, particularly on a low resolution display.

However, if the display can show intermediate shades of gray, then anti-aliasing can be applied. For example, a pixel will be black if it is completely within one of the text characters, white if it's completely within the background, or an intermediate shade of gray according to the proportions of the pixel which overlap the black and white areas. The same technique works similarly with other foreground and background colors.

A common implementation of anti-aliasing involves electronically rendering the entire image at a resolution higher than that of the final output provided to the display monitor. A weighted resampling is then performed on the image data to reduce the resolution of the image. The resampling reduces the resolution to that specified for output to the display monitor.

While providing an anti-aliasing effect, this technique is, however, inefficient. For example, all parts of the image are subject to the anti-aliasing process, when anti-aliasing need only be performed on pixels depicting edges within the image. This technique also increases the time required to render an image because the entire image must be created at a higher resolution and then redacted for output. Additional cost is incurred to supply the extra memory required to hold the higher resolution image data during processing.

Another anti-aliasing technique adds extra information for each pixel within the displayed image. This additional information includes a flag for each pixel situated on an edge of an object within the displayed image and specifies a sub-pixel geometry for the object or objects of which that pixel is a part.

While, this technique provides an anti-aliasing effect, it is still highly inefficient. For example, in order to accommodate the extra information that may be associated with any pixel, the system's data buffer, called a Z-buffer, must be greatly expanded into an anti-aliasing buffer or A-buffer.

A traditional prior art Z-buffer is a fixed set of memory where there is a color, some number of control flags and a Z-distance value kept for every pixel location on the display screen. When data defining a particular fragment of a polygon arrives from the rendering engine (e.g., rasterizer, texture unit et al) it has a specific pixel location it is assigned to that is correlated to a specific memory location in the Z-buffer. If that location does not yet have a fragment assigned then the incoming data is placed in the Z-buffer at that location. In the case where data for a fragment associated with a particular pixel is received in the Z-buffer and data for another fragment associated with that same pixel has already been stored in the Z-buffer, then the Z values of the incoming fragment and the current location contents are compared. If the incoming fragment has a Z distance that is greater than the current entry in the Z-buffer, the incoming data is discarded or ignored. If the incoming fragment has a smaller Z-distance, the data of the incoming fragment replaces the current Z-buffer entry for that pixel. The result for equal Z values is usually controllable through a register setting.

A Z-buffer may also support partial transparency in the displayed image by applying rules that define how an incoming fragment may or may not be blended with the current Z-buffer contents. If the Z-buffer supports partial transparency then there is an extra bit and a transparency level value added to each fragment and each Z-buffer location to indicate whether transparency is being applied and what the blending level is.

The difference between an A-buffer and a Z-buffer is that an A-buffer keeps stacks of fragment data at edge locations and a Z-buffer does not. Regardless of the number of edge fragments applied, the "depth" of the Z buffer at a particular location does not change. In contrast, an A-buffer provides enough memory space for the data of each pixel to accommodate all the data described above. If that pixel is situated on an edge within the displayed image, it has additional Z-distance and sub-pixel geometry information for each underlying polygon fragment(s). In an A-buffer, each edge pixel location may have an entire stack of polygonal fragments associated therewith, for which data must be stored.

Some implementations of A-buffers do not perform an entire sub-sampling of the sub-pixel geometry and seams may occur. In such implementations, it may be necessary to draw all the objects on the display monitor twice in an attempt to eliminate these seams. This frequently results in visual artifacts on the screen, i.e., ghost images that are not intended as part of the displayed image. A high-quality A-buffer can eliminate these problems with visual artifacts, but incurs the cost of maintaining the exact sub-pixel geometry for each fragment of the objects being displayed. Such a high-quality A-buffer, and the complexity of the control mechanisms required to operate it, add excessively to the expense of the system.

Consequently, there is a need in the art for an improved system and method of anti-aliasing the edges within an electronically displayed image such that the edges are visually smoothed, but the anti-aliasing system is not unduly slow or prohibitively expensive.

SUMMARY

In one of many possible embodiments, the present invention provides a polygon rendering system for receiving geometric data defining a polygon in an image being generated. The polygon rendering system renders the geometric data as pixel data. The pixel data defines pixels used to display the image. The system comprises a first memory buffer for storing the pixel data. It also comprises a second memory buffer for storing additional pixel data used to render edge pixels at a higher resolution than pixels that are not the edge pixels. Edge pixels are pixels that are located on an edge of the polygon in the image. The system also comprises a display controller for outputting the pixel data in the first memory buffer to output circuitry. The polygon rendering system identifies which of the pixels are the edge pixels and the display controller updates contents of the first buffer with data based on contents of the second buffer.

Another embodiment of the present invention provides that the additional pixel data is used to compute a color value for the edge pixels. The additional pixel data comprises a cluster of sub-pixel data for each of the edge pixels of the image. The sub-pixel data defines a number of sub-pixels. The sub-pixel data comprises a color value for each of the sub-pixels in the cluster. The display controller computes a color value for the edge pixels based on an average of the color values for each of the sub-pixels in each cluster that corresponds to the edge pixels and stores the computed color value in a field corresponding to the edge pixels in the first buffer.

Another embodiment of the present invention is that when the polygon rendering system renders pixel data defining an edge pixel, the display controller writes a memory offset value in a data field corresponding to the edge pixel in the first buffer. This memory offset value indicates an address of the additional pixel data corresponding to the edge pixel in the second buffer.

The present invention also encompasses the method of manufacturing and operating the polygon rendering system described above. For example, the present invention encompasses a method of rendering geometric data as pixel data. The geometric data defines a polygon in an image being generated. The pixel data defines pixels used to display the image. The method comprises identifying which of the pixels are edge pixels. Edge pixels are located on an edge of the polygon. The method also comprises allocating memory in a second memory buffer for storing additional pixel data used to render the edge pixels at a higher resolution than pixels that are not the edge pixels. This second buffer is in addition to a first memory buffer.

Another embodiment of the present invention provides a rasterizer unit that is configured to render geometric data as pixel data and identify an edge pixel located on an edge of the polygon. When the rasterizer unit identifies the edge pixel, the rasterizer unit outputs data that signals a display controller to allocate memory to a second memory buffer for storage of additional pixel data used to render the edge pixel at a higher resolution than pixels that are not the edge pixels. The second buffer is in addition to a first memory buffer for storing the pixel data.

Another embodiment of the present invention provides a display controller for controlling the first and second memory buffers.

Another embodiment of the present invention provides computer readable instructions on a medium for storing computer readable instructions wherein the instructions, when executed, cause a processor to perform the method described above.

Another embodiment of the present invention provides firmware stored on a memory unit of a polygon rendering system that causes the system to perform the method described above.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

FIG. 5 is a table that illustrates an exemplary organizational structure of a cluster of sub-pixel data in the additional memory buffer according to an embodiment of the present invention.

FIG. 5a is a chart illustrating the data fields in a segment of the additional memory buffer for a two by two array of sub-pixels according to the present invention.

FIG. 8 is a chart illustrating the data fields in a segment of the additional memory unit for a four by four array of sub-pixels according to the present invention.

FIG. 9 is a table that illustrates an additional exemplary organizational structure of a cluster of sub-pixel data in the additional memory buffer, according to an embodiment of the present invention.

FIG. 9a illustrates the data fields and structure of the additional memory buffer for an edge pixel of FIG. 7.

Throughout the drawings, identical reference numbers designate similar, but not necessarily identical, elements.

DETAILED DESCRIPTION

The present invention provides system in which additional memory is allocated and used as needed by an anti-aliasing system so that pixels at the edge of a polygon, or object, in an image being displayed or printed can be rendered using a wealth of sub-pixel data. The additional memory is used to store the extra data required for edge pixels that are rendered at a higher resolution than other pixels in the image. The additional memory may be a designated portion of the Z-buffer itself or it may be a separate memory buffer. With higher resolution pixels provided at the edges of the image elements, anti-aliasing is accomplished without video artifacts or the need for an expensive and complex anti-aliasing buffer (i.e., an A-buffer).

In an image display or printing system, particularly where the image is generated or processed using a computer, the image may be represented in the memory of the computer as a number of geometric data, i.e., polygonal shapes or frameworks to which particular textures are then applied to complete the image as the image is displayed or printed. Consequently, as the geometric data is retrieved or generated by the computer, it must be processed through a geometric data processing system that interprets the polygonal and texture data to render the completed image. Such a system, according to the principles of the present invention, is illustrated in FIG. 1.

Figure 1:
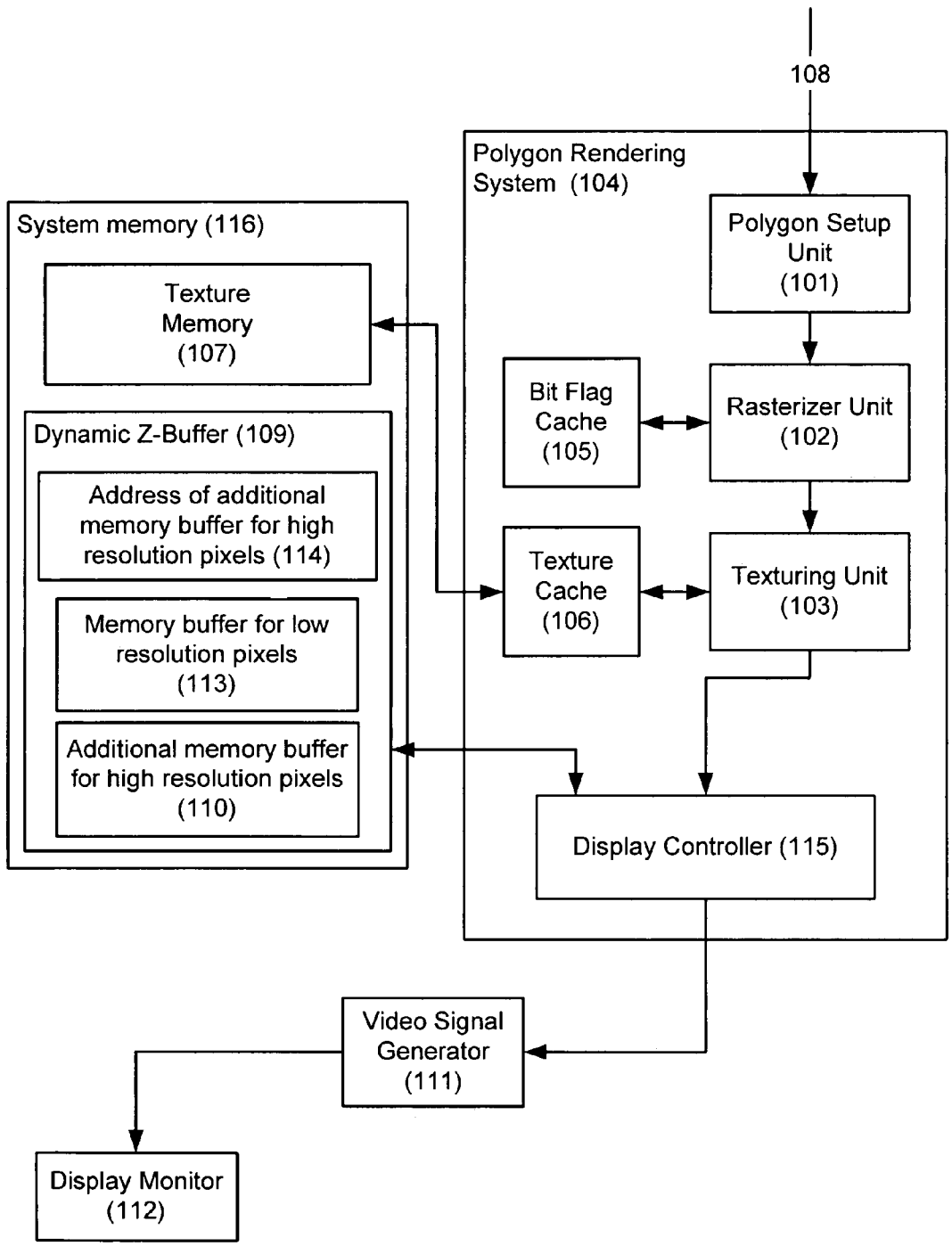
FIG. 1 is a block diagram illustrating the anti-aliasing system of the present invention implemented with the address of the additional memory buffer stored in the Z-buffer.

FIG. 1 illustrates a portion of an image processing system associated with, for example, a display monitor (112). As will be understood by those skilled in the art, the elements of FIG. 1 include a combination of hard and software elements, where some of the elements can be embodied as either, or as firmware depending on the needs and design considerations of a particular implementation.

As shown in FIG. 1, geometric and texture data (108) for the image to be rendered is received from a host computer or other system that has retrieved or generated the geometric data. This data is received by a polygon rendering system (104). As shown in the exemplary image processing system of FIG. 1, the polygon rendering system (104) includes a polygon setup unit (101), a rasterizer unit (102), and a texturing unit (103). The polygon rendering system (104) may have additional components beyond those shown in FIG. 1, such as a Z-distance fog unit. The components comprising the polygon rendering system (104) may be discrete components or they may be all integrated into one component, such as an application specific integrated circuit (ASIC), field-programmable gate array (FPGA), digital signal processor (DSP), or some other type of integrated circuit (IC), for example. If the components comprising the polygon rendering system (104) are discrete components, then they may also be ASICs, FPGAs, DSPs, or some other type of IC.

The polygon rendering system (104) preferably has system memory (116), as shown in FIG. 1. The system memory (116) preferably includes texture memory (107) and a dynamic Z-buffer (109). These memory components will be described in more detail below. The system memory (116) may or may not be separate from the memory used by a host computer's central processing unit (CPU), depending on the implementation architecture.

The polygon setup unit (101), operating on principles known in the art, reformats the geometric data (108) into an input form required by the rasterizer unit (102). The texturing unit (103), also operating on principles known in the art, adds additional texture data to the polygonal shapes and textures specified in the geometric data signal (108). The texturing unit (103) operates by reading texels (bits of texture data) from the appropriate textures for a particular image from a texture database or memory (107).

After the geometric data has been formatted for the rasterizer unit (102), and before any additional textures are added by the texturing unit, the geometric data must be rasterized by the rasterizer unit (102). The rasterizer unit (102) processes the geometric data and identifies the edge pixels associated with a particular image or frame that is to be rendered (i.e., displayed on the display monitor (112)). Edge pixels are pixels that are located along the edges of the polygons, or objects, of the image that is being rendered. The rasterizer unit (102) also determines whether the edge pixel requires sub-pixels to accurately represent it. The edge pixels of interest for anti-aliasing are those that are only partially covered with the polygons, or objects, that are part of the image that is to be rendered. These edge pixels may have to be anti-aliased to appropriately render the polygon, as will be described in more detail below. The rasterizer unit (102), whether a discrete component or integrated into the polygon rendering system's (104) IC, is preferably capable of being configured or programmed to identify the edge pixels of a particular frame or image. It is also preferably capable of being configured or programmed to identify edge pixels and render them at a higher resolution. This higher resolution data is stored within the additional memory (110) allocated for high resolution data by the dynamic Z-Buffer (109).

After the geometric data has been rasterized and textured, it is output to a dynamic Z-buffer (109). A display controller (15) scans the contents of the Z-buffer and outputs data to a video signal generator (111). The particular data that the display controller (15) outputs to the video signal generator (111) will be described in more detail below. The video signal generator (111) then uses the data to generate a video signal which is output to a display monitor (112). The display monitor (112) uses the video signal to render a desired image on a display screen of the display monitor (112). The video signal generator (111) and display monitor (112) are only examples of output circuitry that can be connected to the polygon rendering system (104). Many other types of output circuitry can be used in accordance with the principles of the current invention. As used herein and in the appended claims, unless otherwise specifically denoted, "output circuitry" will refer to any device that can receive the output of display controller (15) such as a video signal generator (111) attached to a display monitor (112) or a printer, for example.

Under the principles of the present invention, the polygon rendering system (104) and Z-buffer (109) are used to anti-alias the edges of the polygons, or objects, in the image before the data is output to the video signal generator (111). This is accomplished as follows.

The rasterizer unit (102) preferably communicates with a bit cache (105) that holds a single bit that corresponds to each pixel on the screen of the display monitor (112). Before each image or scene is rendered, the bit cache (105) is initialized to contain a zero ("0") value at each location within the bit cache (105) that corresponds to the pixels of the image being rendered. According to an embodiment of the present invention, the rasterizer unit (102) identifies the edge pixels of the polygons, or objects, of the image that is being rendered. It also identifies which of the edge pixels must be rendered at a higher resolution. A vertical or horizontal polygon edge may naturally occur that is exactly aligned with the pixel boundaries. This special case of an edge does not need to be rendered at a higher resolution given the polygon completely covers the entire pixel area.

When the rasterizer unit (102) identifies an edge pixel that requires rendering at a higher resolution, it writes a one ("1") to the pixel location in the bit cache (105) corresponding to that pixel location. If the current bit cache value at that location is already "1," nothing else need happen. For each of these edge pixels, the rasterizer unit (102) renders them at a higher resolution. As will be described in more detail below, this preferably includes generating color data and Z-distance data for four or sixteen sub-pixels that are used to anti-alias and render the corresponding edge pixel. Some embodiments may be constrained to only generate a single Z distance that is assigned relative to each position of the lower resolution data.

The rasterized pixel data and the contents of the bit flag cache (105) are communicated to the Z-buffer (109) via the display controller (115). The bit flag from the bit flag cache (105) will be referred to hereafter as the "hi-res bit flag" because it indicates whether its corresponding pixel is an edge pixel that must be rendered with higher resolution than pixels on the interior of the polygon. The rasterized pixel data and the hi-res bit flag are preferably stored by the display controller (115) in a portion of the Z-buffer (109) called a memory buffer for low resolution pixels (113). When the rasterized pixel data and the hi-res bit flag are communicated to the Z-buffer, the display controller (115) detects the value of the hi-res bit flag. If the hi-res bit flag is set to "0," the display controller (115) stores the pixel data in a location associated with the particular pixel in the memory buffer for low resolution pixels (113). According to an embodiment of the present invention, if the display controller (115) receives pixel data including a hi-res bit flag set to "1," the display controller (115) allocates additional memory in an additional memory buffer for high resolution pixels (110). The additional memory buffer (110) is used for storage of sub-pixel data that will be used to render the associated edge pixel in higher resolution. The additional memory buffer for high resolution pixels (110) may be a designated portion of the Z-buffer (109) structure, as shown in FIG. 1, or it may be a separate memory buffer.

The display controller (115) may be within an ASIC, FPGA, DSP, or some other type of IC. It could also be integrated into the polygon rendering system's (104) IC. It is preferably capable of being configured or programmed to dynamically allocate additional memory in the additional memory buffer (110) based on data communicated to it by the output of the polygon rendering system (104) or based on some other type of control data.

After an image has been rendered, the polygon rendering system (104) may output a command to clear allocated memory in the additional memory buffer (110) and reset the display controller (115). Other command types between the rendering system (104) and the Z-buffer (109) may be included as needed to implement additional features.

The memory buffer for low resolution pixels (113) preferably stores a number of types of data relating to a pixel that is to be rendered. For example, the memory buffer (113) may include data such as a color triplet value, a Z-distance value, and bit flags. The color triplet specifies the color the corresponding pixel and comprises a red, green, and blue value. The Z-distance value specifies the distance of the polygon associated with that pixel from the view plane. The bit flags typically hold information about the current status of the pixel location. In another embodiment, the Z-buffer (109) may hold color values in some other format such as Luminance-Bandwidth-Chrominance (YUV).

As described above, according to the principles of the present invention, the bit flags include a high-res bit for each pixel in the image that is being rendered. If a pixel's hi-res bit flag indicates that the pixel is an edge pixel (i.e., the value of the hi-res bit flag is "1"), then the portion of the memory buffer for low resolution pixels (113) that is normally used to hold the Z-distance value for that pixel is instead preferably used to store a memory offset value. The memory offset value gives the location in the additional memory buffer (110) of the edge pixel's corresponding sub-pixel data that has been stored. The memory offset value is determined by the display controller (115) as locations in the additional memory buffer (110) are allocated. The display controller (115) also preferably writes the memory offset data to the Z-distance field.

As noted above, the additional memory buffer (110) holds extra data for edge pixels so that these pixels can be rendered at a higher resolution. By rendering edge pixels at a higher resolution, anti-aliasing can be effected. In one embodiment, each edge pixel is preferably divided into four sub-pixels. Each sub-pixel has its own pixel attributes. For example, each sub-pixel may have an associated color triplet, flag bit, and Z-distance. The four sub-pixels are arranged as a rectangular, two by two matrix, or array. In another embodiment, each edge pixel is preferably divided into 16 sub-pixels that are arranged as a rectangular, four by four matrix, or array. The present invention is not limited to two by two or four by four sub-pixel arrays. Rather, the present invention can be used with any sub-pixel array size. The data of the sub-pixels is used to generate composite data defining the corresponding final color of the edge pixel that is stored in the low resolution buffer (113). In other words, the sub-pixels' color values are averaged together by the display controller (115) to produce an anti-aliased edge pixel. The display controller (115) writes the new averaged color triplet into the color data field of the memory buffer for low resolution pixels (113) that is associated with the edge pixel, as will be described in more detail below in connection with FIG. 3a.

Figures 3, 3A:
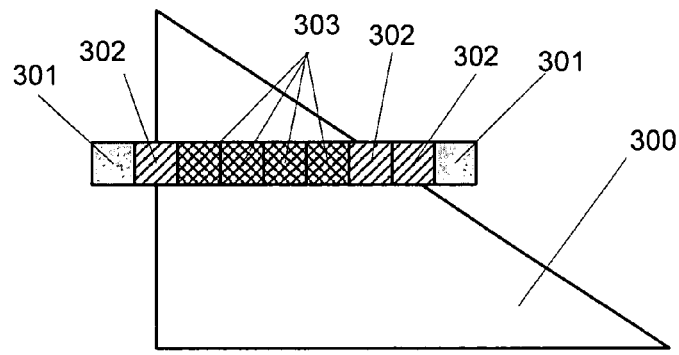
FIG. 3 is a diagram of a polygon and pixels being processed and displayed according to the principles of the present invention.
FIG. 3a is a chart illustrating the data fields in a segment of the dynamic Z-buffer of the present invention.

FIG. 3 illustrates a representative polygon (300) with a row of pixels which have been generated across that polygon (300). As shown in FIG. 3, there are three basic types of pixels. First, there are pixels (301) which are outside the polygon (300) and which are used to represent the background of the image. Second, there are pixels (303) that are wholly within the polygon (300) and are used to represent the color and texture of the polygon. Finally, there are pixels (302) that contain an edge of the polygon (300). These pixels are called edge pixels (302) because they are only partially covered by the polygon (300) and may require anti-aliasing in order to appropriately render the polygon (300).

FIG. 3a is a table representing an exemplary portion of the memory buffer for low resolution pixels (113) of the dynamic Z-buffer (109). As shown in FIG. 3a, the memory buffer (113) preferably contains three data fields that correspond to each pixel in an image that is being rendered. The first field (330) contains the bit flag(s) associated with the pixel. The second field (331) contains the color data in the form of a color triplet. The third field (332) contains the Z-distance data. The entries in the table, from top to bottom, correspond to the nine pixels (301–303) illustrated in FIG. 3, as viewed from left to right. The table representing the memory buffer (113) in FIG. 3a is only an example of the possible fields that a memory buffer can contain. The number and type of fields for the memory buffer (113) will vary as best serves a particular application of the present invention.

As shown in FIG. 3a, a preferred embodiment is that the first field (330) contains a two-bit flag that is used to determine if a pixel is a background pixel (301), a pixel within a polygon (303), or an edge pixel (302). The first bit indicates whether the pixel is part of a polygon or in the image background. In the example of FIG. 3a, if the first bit is a "0", then the corresponding pixel is a background pixel (301). Because all background pixels are the same color, background pixels are preferably rendered to the display in a designated background color. In this manner, individual color data does not need to be stored for each background pixel. If the first bit is a "1", then the corresponding pixel is either entirely covered by a polygon in the image or partially covered by a polygon in the image. The second bit in the two-bit flag is the hi-res bit flag. In the following examples, if the hi-res bit is a "1", then the corresponding pixel is an edge pixel.

Consequently, as illustrated in FIGS. 3 & 3a, a background pixel (301) is indicated by a "00" in the bit flag field. The second bit, the hi-res bit flag, is set to "0" because the background pixel (301) is not an edge pixel. The color data field for this pixel (301) contains the pixel's color triplet value. Likewise, the Z-distance field contains the pixel's Z-distance value. Because a background pixel cannot be an edge pixel, a bit flag value of "01" would be treated the same as a bit flag value of "00."

A pixel (303) that is internal to the polygon (300) is indicated by a "10" in the bit flag field. The second bit, the hi-res bit flag, is set to "0" because the internal pixel (301) is not an edge pixel. The color data field for this pixel (303) contains the pixel's color triplet value. Likewise, the Z-distance field contains the pixel's Z-distance value.

In the example of FIG. 3a, an edge pixel (302) is indicated by a bit flag field value of "11." The second bit, the hi-res bit flag, is set to "1" because the pixel (302) is an edge pixel. For an edge pixel (302), as shown in FIG. 3a, the color triplet field contains an averaged color triplet value. The averaged color triplet value is an average of the color triplet data for the sub-pixels corresponding to that edge pixel (302). The color triplet values for the sub-pixels are stored in an allocated portion of the additional memory buffer for high resolution pixels (110). The sub-pixels' color data is averaged together by the display controller (115) to produce an averaged color triplet that is used as the color triplet for the edge pixel (302). This averaging process will be described in more detail below.

As shown in FIG. 3a, an embodiment of the present invention is that the Z-distance field for an edge pixel (302) does not contain Z-distance data, but rather contains a memory offset value that indicates where the edge pixel's (302) sub-pixel data is stored in the additional memory buffer (110). The memory offset value is important because the same pixel (302) may be part of a different polygon that is to be rendered. The display controller (115) normally compares the Z-distance value that is already in the memory buffer for low resolution pixels (113) to the new Z-distance value. If the new Z-distance value is smaller than the old Z-distance value, the display controller (115) replaces the data in the memory buffer (113) with the new pixel data associated with the new polygon that is being rendered. However, if the data that is already present in the memory buffer (113) is associated with an edge pixel, the display controller (115) needs to know where the Z-distance values for the sub-pixels associated with the edge pixel are located in the additional memory buffer (110) so that it can compare them with the Z-distance value of the new polygon that is being rendered.

Figure 4:
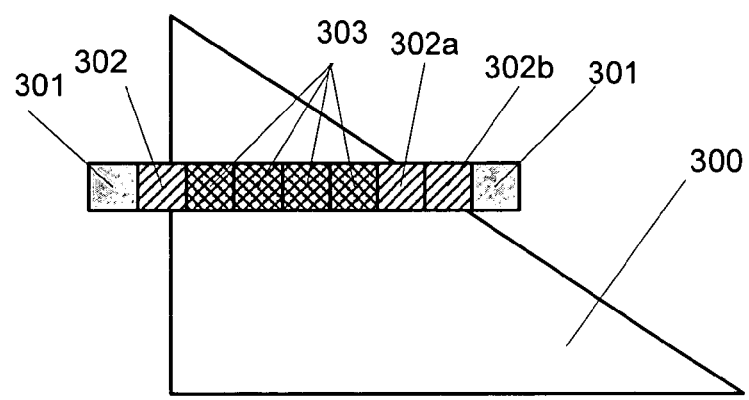
FIG. 4 is a diagram of a polygon and pixels being processed and displayed according to the principles of the present invention.

FIG. 4 is substantially identical to FIG. 3. However, FIG. 4 specifies the location of a particular edge pixel (302a) on the right-hand edge of the polygon (300). This particular edge pixel (302a) will be used to further explain the principles of the present invention. First, using the exemplary configurations of FIG. 4a–6a, preferred embodiments of the present invention that use a two by two array of sub-pixels to effect an anti-aliased edge pixel will be explained. Next, using the exemplary configurations of FIGS. 7–9, preferred embodiments of the present invention that use a four by four array of sub-pixels to effect an anti-aliased edge pixel will be explained. The following explanations are examples of how anti-aliasing is preferably performed and how the additional memory buffer (110) is dynamically allocated under each of these preferred embodiments of the present invention. Other anti-aliasing techniques that allocate space in an additional memory buffer (110) for sub-pixels associated with edge pixels (302) are within the scope of the present invention. These other approaches include using sizes other than two by two and four by four sub-pixel arrays to effect an anti-aliased edge pixel.

Figure 4A:
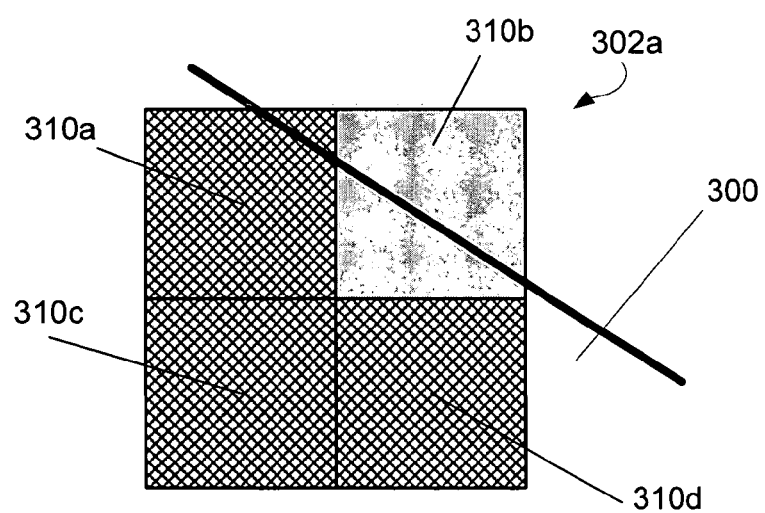
FIG. 4a is a diagram of a pixel containing four sub-pixels according to the present invention.

FIG. 4a provides a more detailed illustration of the edge pixel (302a). The edge pixel (302a) in FIG. 4a is divided into four sub-pixels (310) which are arranged in a rectangular, two by two array, or matrix. As shown in FIG. 4a, the edge of the polygon (300) passes mostly through sub-pixel (310b). Sub-pixels (310c & 310d) are missed entirely by the edge (300), while the other sub-pixel (310a) is only grazed by the edge of the polygon (300).

Under a preferred sub-pixel scheme, a sub-pixel will be treated as an internal, or covered, pixel if the majority of that sub-pixel is within the polygon. A sub-pixel will be treated as a background pixel if the majority of that sub-pixel is outside the polygon. Consequently, sub-pixels (310a, 310c & 310d) will be treated as pixels internal to the polygon and will be rendered similarly to the pixels (303) described above. Sub-pixel (310b) will be considered outside the polygon (300) and will be rendered as a background pixel, similar to the pixels (301) described above. Alternatively, if another polygon is immediately adjacent to the polygon (300) and a majority of the area of sub-pixel (310b) falls within that second, adjacent polygon, then sub-pixel (310b) will be rendered as a pixel internal to that second, adjacent polygon.

FIG. 5 is a table that illustrates an exemplary organizational structure of a cluster of sub-pixel data in the additional memory buffer (110), according to an embodiment of the present invention. As shown in FIG. 5, the organizational structure is similar to the organizational structure of the memory buffer for low resolution pixels (see FIG. 3a). FIG. 5 shows that the sub-pixel data is preferably arranged in clusters of sub-pixels. Each cluster of sub-pixels corresponds to pixel data associated with a polygon edge and therefore is rendered at a higher resolution. The organizational structure of FIG. 5 may be used where there are four sub-pixels in the sub-pixel cluster.

The table of FIG. 5 shows that there are three fields corresponding to each sub-pixel entry in the additional memory buffer (110). As shown in FIG. 5, the three fields are a bit flag field, a color data field, and a Z-distance field. The color data field is for a color triplet value corresponding to a particular sub-pixel. The Z-distance data is the Z-distance of the sub-pixel. The bit flag field is used to indicate whether the color data for the corresponding sub-pixel should be used in the average that results in the color data defining the edge pixel (302a). For example, when the bit flag is on, i.e., set to the value "1," the color triplet data for that sub-pixel will be used to generate an averaged color triplet that will correspond to the associated edge pixel (302a). If the bit flag is set to "0," the sub-pixel is a background pixel and its color data will be assigned the background color value when generating the edge pixel's (302a) averaged color triplet. If the bit flag is "0", the data for the color triplet and Z-distance are ignored because the assigned background color is being used.

FIG. 5a illustrates the data fields and structure of the additional memory buffer (110) for two of the pixels (302a & 302b) of FIG. 4. The additional memory buffer (110) is preferably arranged as a simple linear array of sub-pixel clusters. Because this example corresponds to a two by two sub-pixel array, each sub-pixel cluster holds four color triplets, four Z-distance values, and four sets of bit flags.

The first entry in FIG. 5a corresponds to the sub-pixel (310a). As shown in FIG. 5a, the bit flag value for this sub-pixel is "1." Thus, sub-pixel's (310a) color data is used to generate the color triplet value of the edge pixel (302a). The next entry is for the sub-pixel (310b). In this case, the bit flag is set to "0." Thus, sub-pixel's (310b) color data comes from the background color assigned to the rendered scene when generating the average color data for the edge pixel (302a). The entries corresponding to sub-pixels (310c & 310d) are shown in FIG. 5a.

An embodiment of the present invention is that the display controller (115) averages the color data of the sub-pixels and writes the resulting blended color triplet value in the memory buffer for low resolution pixels (113). Thus, in this example, the display controller (115) averages the color triplet values for sub-pixels (310a, 310c, & 310d) based on the color values held within the high resolution memory (110) and the background color for sub-pixel (310b). The display controller (115) then writes the averaged color triplet value in the color data field (331) corresponding to the associated edge pixel (302a) in the memory buffer for low resolution pixels (113). In other words, the color triplet values for the 4 sub-pixels (310a, 310b, 310c, & 310d) are averaged to produce the color triplet value defining the corresponding edge pixel (302a) in the rendered image.

The sub-pixel data corresponding to the edge pixel (302b) are also shown in FIG. 5a. As shown also in FIG. 5a, the additional memory buffer (110) may contain any number of clusters of sub-pixel data.

Figure 6:
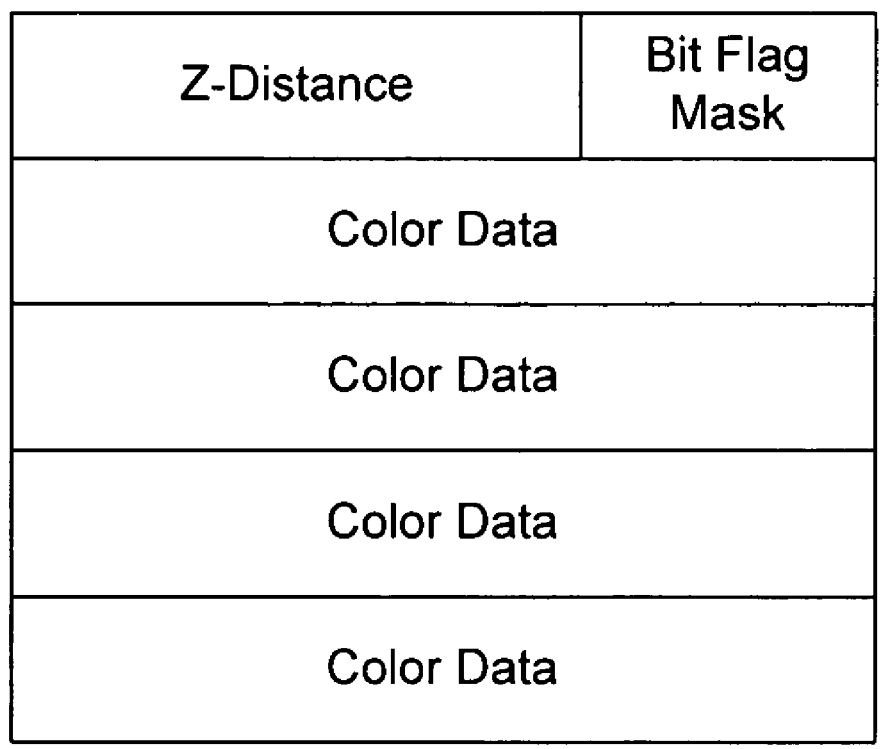
FIG. 6 is a table that illustrates an additional exemplary organizational structure of a cluster of sub-pixel data in the additional memory buffer, according to an embodiment of the present invention.

FIG. 6 is a table that illustrates another exemplary organizational structure of a cluster of sub-pixel data in the additional memory buffer (110), according to an embodiment of the present invention. Each cluster of sub-pixels corresponds to an edge pixel. The organizational structure of FIG. 6 may be used in applications that only provide one Z-distance value for the entire cluster of sub-pixels instead of individual Z-distance values for each of the sub-pixels. In yet another embodiment, these single Z-values may remain located within the buffer for low resolution pixel data (113).

The organizational structure of FIG. 6 may be used when there are four sub-pixels per edge pixel. As shown in FIG. 6, the organizational structure comprises one Z-distance field and one bit flag mask field that correspond to each of the sub-pixels in the sub-pixel cluster. The structure also allows for a color data field for each of the four sub-pixels, as shown in FIG. 6. The bit flag mask comprises the same number of bits as there are sub-pixels and indicates which of the sub-pixels' color data is to be used in the averaging that will result in the color data for the edge pixel (e.g.; 302a). An example of the organizational structure of FIG. 6 is given below in connection with FIG. 6a.

Figure 6A:
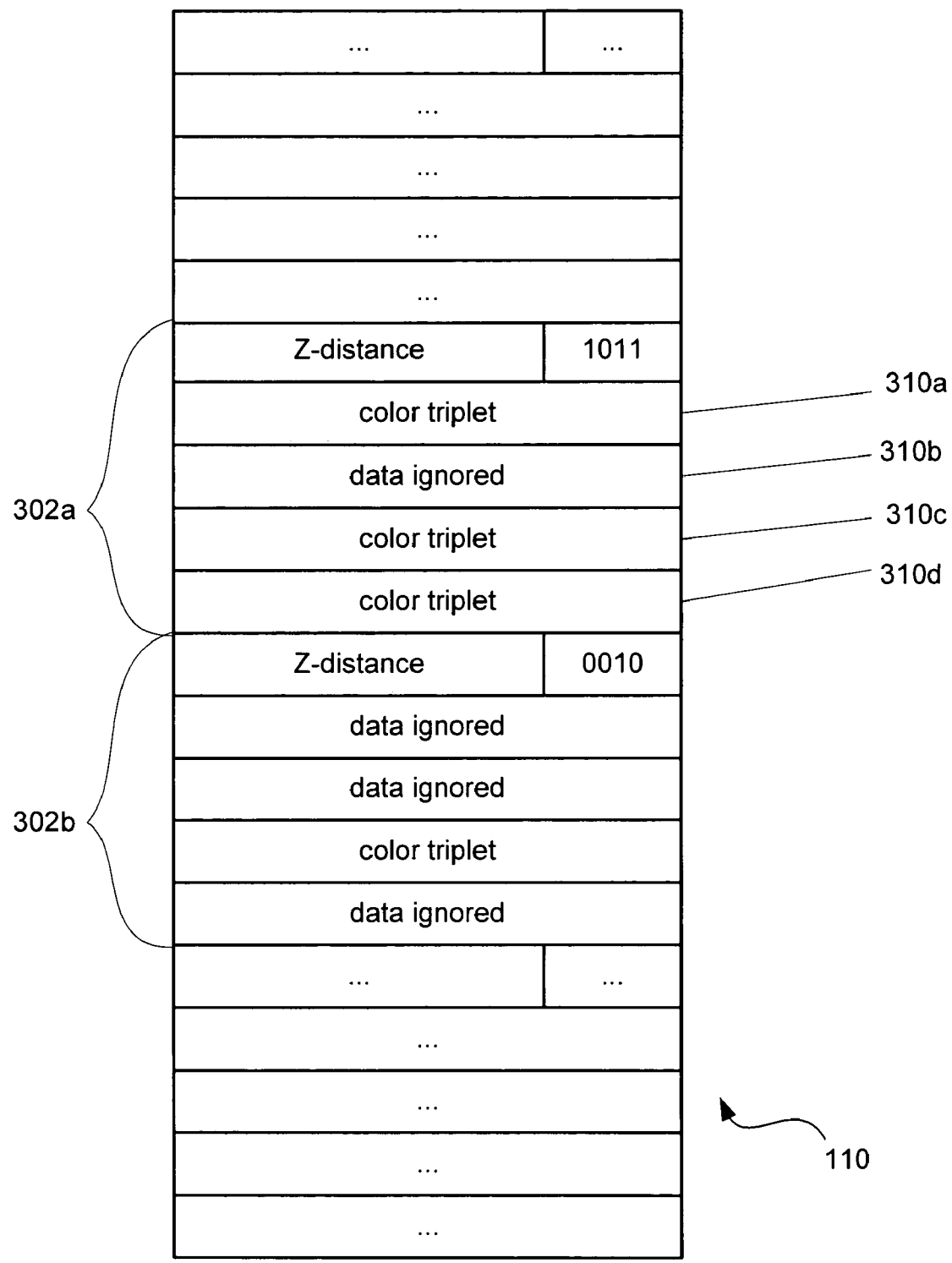
FIG. 6a illustrates the data fields and structure of the additional memory buffer for two of the pixels of FIG. 4.

FIG. 6a illustrates the data fields and structure of the additional memory buffer (110) for two of the pixels (302a & 302b) of FIG. 4. The example of FIG. 6a uses the organizational structure of FIG. 6. As shown in FIG. 6a, the Z-distance value for the edge pixel (302a) is stored in the first field. The bit flag mask field for the edge pixel (302a) is "1011". A "1" indicates that the color triplet data for its corresponding sub-pixel will be used to generate an averaged color triplet value corresponding to the edge pixel (302a). A "0" indicates that the corresponding sub-pixel is a background pixel and that its color data comes from the background color assigned to the rendered scene. The procedure for averaging the sub-pixels' color triplet values is the same as described above in connection with FIG. 5a.

The entries corresponding to the sub-pixels of the edge pixel (302b) are also shown in FIG. 6a. As shown also in FIG. 6a, the additional memory buffer (110) may contain any number of clusters of sub-pixel data.

Figure 7:
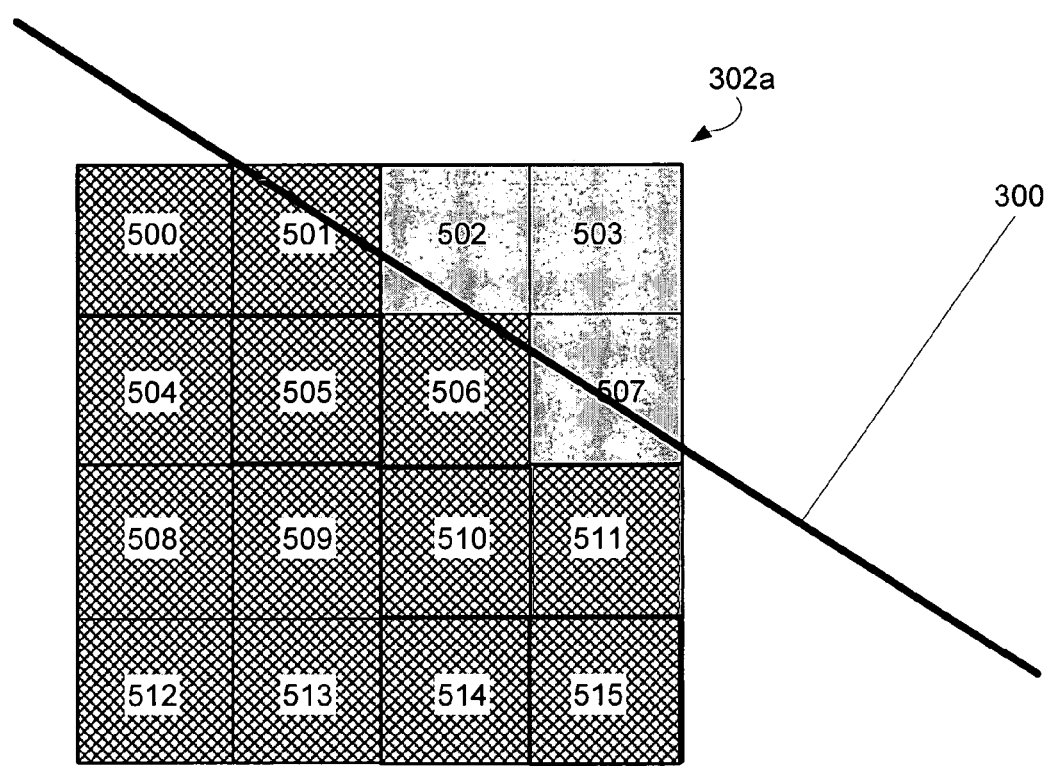
FIG. 7 is a diagram of a pixel containing 16 sub-pixels according to the present invention.

FIG. 7 and FIG. 8 illustrate another preferred embodiment of the present invention that uses a four by four array of sub-pixels to effect an anti-aliased edge pixel. Again, the edge pixel (302a) on the right-hand edge of the polygon (300) of FIG. 4 will be used to explain the further explain the principles of the present invention related to FIG. 7 and FIG. 8.

FIG. 7 provides a more detailed illustration of the edge pixel (302a). As shown in FIG. 7, the edge pixel (302a) in this case is divided into 16 sub-pixels (500–515) which are arranged in a rectangular, four by four array, or matrix. The color triplet values for the 16 sub-pixels (500–515) are averaged to produce the color triplet value defining the corresponding edge pixel (302a) in the rendered image.

As shown in FIG. 7, the edge of the polygon (300) passes mostly through sub-pixels (502 & 507). Sub-pixel (502) is entirely outside the polygon (300). Sub-pixels (500, 504, 505, & 508–515) are missed entirely by the edge of the polygon (300), while the other sub-pixels (501 & 506) are only grazed by the edge of the polygon (300).

Like the example of FIG. 4a, a sub-pixel in FIG. 7 will be treated as an internal, or covered, pixel if the majority of that sub-pixel is within the polygon. A sub-pixel will be treated as a background pixel if the majority of that sub-pixel is outside the polygon. Consequently, sub-pixels (500, 501, 504–506, & 508–515) will be treated as pixels internal to the polygon and will be rendered similarly to the pixels (303) described above. Sub-pixels (502, 503, & 507) will be considered outside the polygon (300) and will be rendered as a background pixel, similar to the pixels (301) described above. Alternatively, if another polygon is immediately adjacent to the polygon (300) and a majority of the area of sub-pixel (310*b*) falls within that second, adjacent polygon, then sub-pixels (502, 503, & 507) will be rendered as a pixel internal to that second, adjacent polygon.

FIG. 8 illustrates the data fields and structure of the additional memory buffer (110) for the configuration of FIG. 7. The example of FIG. 8 uses the exemplary organizational structure explained in connection with FIG. 5. The additional memory buffer (110) is preferably arranged as a simple linear array of sub-pixel clusters. Because this example corresponds to a four by four sub-pixel array, each sub-pixel cluster holds sixteen color triplets, sixteen Z-distance values, and sixteen sets of bit flags.

The first entry corresponds to the sub-pixel (500). As shown in FIG. 8, the bit flag value for this sub-pixel is "1." Thus, sub-pixel's (500) color data will be used in the average that results in the data defining the color triplet of the edge pixel (302*a*).

The third entry in this table is for the sub-pixel (502). In this case, the bit flag is set to "0." Thus, sub-pixel's (502) color data will come from the designated background color when generating an average color data that results in the color triplet of the edge pixel (302*a*). FIG. 8 shows the data field values for each of the sixteen sub-pixels (500–515) of FIG. 7. The additional memory buffer (110) of FIG. 8 may contain any number of clusters of sub-pixel data. The procedure for averaging the sub-pixels' color triplet values is the same as described above in connection with FIG. 5*a*.

FIG. 9 is a table that illustrates another exemplary organizational structure of a cluster of sub-pixel data in the additional memory buffer (110), according to an embodiment of the present invention. Each cluster of sub-pixels corresponds to an edge pixel. The organizational structure of FIG. 9 may be used in applications that only provide one Z-distance value for the entire cluster of sub-pixels instead of individual Z-distance values for each of the sub-pixels.

The organizational structure of FIG. 9 may be used when there are sixteen sub-pixels per edge pixel. As shown in FIG. 9, the organizational structure comprises one Z-distance field and one bit flag mask field that correspond to each of the sub-pixels in the sub-pixel cluster. The structure also allows for a color data field for each of the sixteen sub-pixels, as shown in FIG. 9. The bit flag mask comprises the same number of bits as there are sub-pixels and indicates which of the sub-pixels' color data will come from the sub-pixel data and which will be assigned the background color as stated previously. An example of the organizational structure of FIG. 9 is given below in connection with FIG. 9*a*. The structure of FIG. 9 may be modified to contain any number of fields so as to accommodate applications that have more or less than sixteen sub-pixels.

FIG. 9*a* illustrates the data fields and structure of the additional memory buffer (110) for the edge pixel (302*a*) of FIG. 7. The example of FIG. 9*a* uses the organizational structure of FIG. 9. As shown in FIG. 9*a*, the Z-distance value for the edge pixel (302*a*) is stored in the first field. The bit flag mask field for the edge pixel (302*a*) is "1100111011111111". A "1" indicates that the color triplet data for its corresponding sub-pixel will come from the color data stored in high resolution buffer (110). A "0" indicates that the corresponding sub-pixel is a background pixel and that its color data will come from the designated background color. Thus, in the example of FIG. 9*a*, all of the sub-pixels (500–515) will have some contribution of color data averaged to produce the color triplet value for the edge pixel (302*a*). The procedure for averaging the sub-pixels' color triplet values is the same as described above in connection with FIG. 5*a*. The additional memory buffer (110) of FIG. 9*a* may contain any number of clusters of sub-pixel data.

Returning to FIG. 1, the display controller (115) scans the contents of the memory buffer for low resolution pixels (113) and outputs them to the video signal generator (111) or some other output circuitry. This scanning process is periodically repeated at a rate specified by the particular application of the present invention. When the contents of the memory buffer (113) are output, only the color triplet data for each pixel is output, sequentially, to the video signal generator (111). If the pixel is an edge pixel, then its averaged color triplet data is output. Thus, the dynamic Z-buffer (109) of the present invention appears to the output circuitry (e.g., 111) like any conventional Z-buffer. Moreover, the dynamic Z-buffer (109) can be of a typical size and complexity for storing pixel data. For an edge pixel where higher resolution and, therefore, more sub-pixel data is required, the display controller (115) dynamically allocates more memory space in the additional memory buffer (110) to contain that data. The final averaged color that is assigned to edge pixels in the low resolution memory buffer produces the anti-aliasing effect. Consequently, anti-aliasing is accomplished without expensive components or video artifacts.

Figure 2:
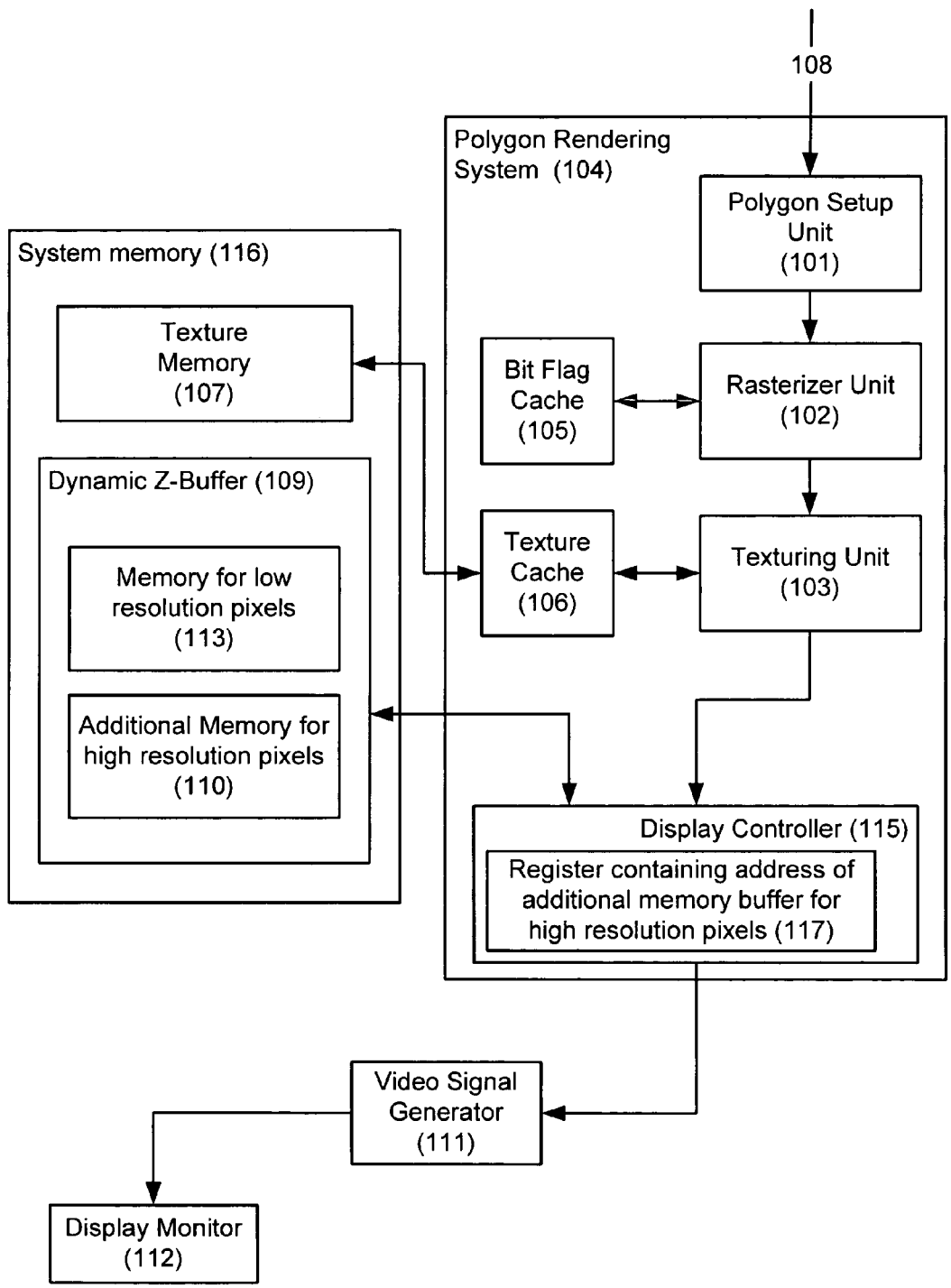
FIG. 2 is a block diagram illustrating the anti-aliasing system of the present invention implemented with the address of the additional memory buffer stored in a register in the display controller.

When the display controller (115) allocates memory for the additional memory buffer for high resolution pixels (110), the starting address of the additional memory buffer (110) is stored in a location that it can refer to later when it accesses the additional memory buffer (110). A preferable location for this address is in the Z-buffer itself (114), as shown in FIG. 1. FIG. 2 shows an alternate embodiment where the address is stored in a register (117) in the display controller (115). However, the starting address for the additional memory buffer (110) can be stored another location as best serves the particular application. Thus, the memory offset value, as shown in FIG. 3*a*, gives the offset value with reference to the address of the beginning of the additional memory buffer (110).

After a frame of video or an image or scene has been rendered, the additional memory buffer for high resolution pixels (110) can be cleared by the display controller (115). More specifically, the polygon rendering system (104) may transmit a reset command to the display controller (115). The display controller (115) may then reset all the bits in the additional memory buffer (110) to "0." The display controller (115) can also reset the value stored in the register or memory location containing the address of the additional memory buffer (114; FIG. 1 or 117; FIG. 2).

Figure 10:
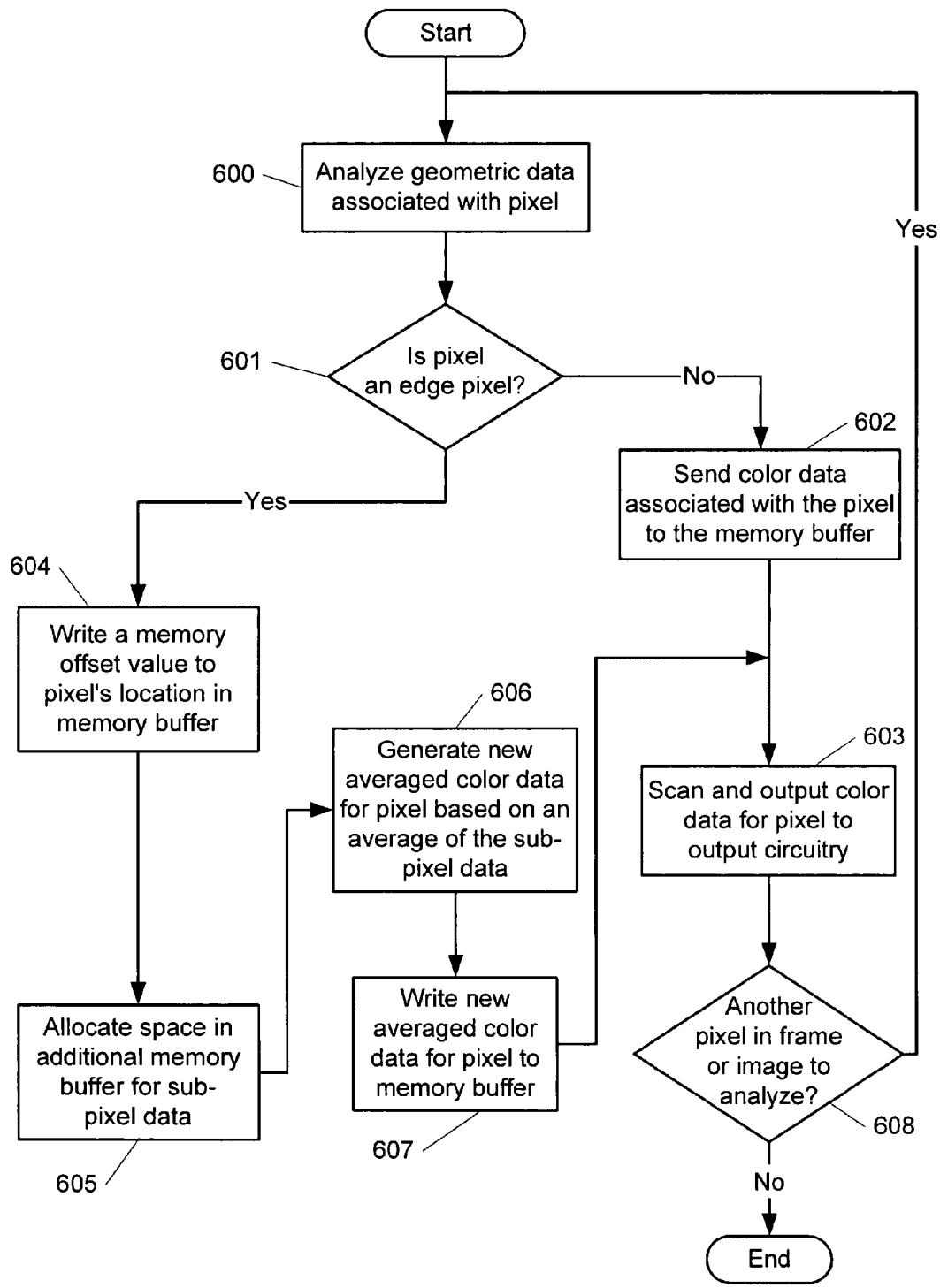
FIG. 10 is a flow chart illustrating a process that a preferable set of computer readable instructions could execute according to the present invention.

The anti-aliasing system of FIG. 1 and FIG. 2 may be controlled, initiated, or programmed by a processor or the like via a set of computer readable instructions, according to principles of another embodiment of the present invention. These computer readable instructions may be constructed in any programming language, such as C, for example, and stored on any medium capable of storing computer readable instructions such as a compact disk (CD), digital video disk (DVD), floppy disk, or hard drive, for example. FIG. 10 is a flow chart illustrating a process that a preferable set of computer readable instructions could execute. The process of FIG. 10 is exemplary and can be modified depending on a particular application of the present invention. Furthermore, the steps described in connection with FIG. 10 can be processed in any order.

As shown in FIG. 10, the processor analyzes the geometric data associated with a pixel in the frame or image that is to be rendered (600). It then determines whether the pixel is an edge pixel (601) of a particular polygon, or object, that needs to be rendered at a higher resolution. If the pixel is not an edge pixel, then the processor sends the color data associated with the pixel to the memory buffer for low resolution pixels. This color data can then be output to output circuitry (603) when the display controller (115) scans the contents of the memory buffer for low resolution pixels. The output circuitry may be the video signal generator (111), a printer, or any other output circuitry.

A function for texturing the rasterized data is not shown in FIG. 10. However, a computer readable instruction could be programmed to accomplish this function as well. Furthermore, any other function that a particular application might include in the polygon rendering system could also be programmed.

Once the processor determines that a pixel is an edge pixel, a memory offset value is written to the pixel's Z-distance field location in the memory buffer for low resolution pixels (604). Other rasterizing functions (not shown in FIG. 10) can also be performed by the processor depending on the particular application.

The processor also allocates space in the additional memory buffer for high resolution pixels for the sub-pixel data that is used to anti-alias the pixel (605). The processor then can generate new color data for the pixel based on an average of the sub-pixel data (606). This new averaged color data is then written to the memory buffer for low resolution pixels (607). This new averaged color data can then be output to output circuitry (603) when the display controller (15) scans the contents of the memory buffer for low resolution pixels. Once the new color data is output to the output circuitry, the processor determines if there is another pixel in the frame or image to analyze (608). If there is, then the process of FIG. 10 is repeated.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A polygon rendering system for receiving geometric data defining a polygon in an image being generated and rendering said geometric data as pixel data, said pixel data defining pixels used to display said image, said system comprising:
    a first memory buffer for storing said pixel data;
    a second memory buffer for storing additional pixel data used to render edge pixels at a higher resolution than pixels that are not said edge pixels, said edge pixels located on an edge of said polygon in said image; and
    a display controller for outputting said pixel data in said first memory buffer to output circuitry;
    wherein said first memory buffer comprises at least three data fields for each of said pixels, said three data fields including a bit flag field containing a hi-res bit flag indicating whether said field's corresponding pixel is one of said edge pixels, a color data field containing a color value for said corresponding pixel, and a Z-distance field containing a Z-distance value for said corresponding pixel;
    wherein said display controller updates contents of said first buffer with data based on contents of said second buffer; and
    wherein, when said polygon rendering system renders pixel data defining an edge pixel, said display controller writes a memory offset value in a data field corresponding to said edge pixel in said first buffer, said memory offset value indicating an address of said additional pixel data corresponding to said edge pixel in said second buffer.

2. The system of claim 1, wherein said display controller allocates memory to said second buffer to store more of said additional pixel data as additional polygons are generated.

3. The system of claim 1, wherein said display controller includes a register for storing a starting address of said second buffer.

4. The system of claim 1, wherein said display controller stores a starting address of said second buffer in a third memory buffer of said polygon rendering system.

5. The system of claim 1, wherein said memory offset value is written in said Z-distance field.

6. The system of claim 1, wherein said system further comprises a rasterizer unit for processing said geometric data and identifying said edge pixels.

7. The system of claim 1, wherein said additional pixel data stored in said second buffer comprises a cluster of sub-pixel data for each of said edge pixels of said image, said sub-pixel data defining a number of sub-pixels.

8. The system of claim 7, wherein said sub-pixel data comprises a color value for each of said number of sub-pixels.

9. The system of claim 8, wherein said display controller computes a color value for said edge pixel, said color value based on an average of said color values for each of said number of sub-pixels in a cluster corresponding to said edge pixel.

10. The system of claim 9, wherein said display controller writes said averaged color value in a field in said first buffer, said field associated with said edge pixel.

11. The system of claim 7, wherein said number of sub-pixels is four.

12. The system of claim 11, wherein said four sub-pixels are arranged in a two by two array of sub-pixels.

13. The system of claim 7, wherein said number of sub-pixels is sixteen.

14. The system of claim 13, wherein said sixteen sub-pixels are arranged in a four by four array of sub-pixels.

15. The system of claim 7, wherein:
    if a majority of an area of a particular sub-pixel in said number of sub-pixels is located within said polygon in said image, said particular sub-pixel is assigned a color value equal to a color value of a pixel wholly internal to said polygon; and
    if a majority of an area of a particular sub-pixel in said number of sub-pixels is located outside said polygon in said image, said particular sub-pixel is assigned a color value equal to a color value of said background.

16. The system of claim 9, wherein, for each of said number of sub-pixels, said second buffer comprises:
   a color data field containing a color value for a corresponding sub-pixel;
   a Z-distance field containing a Z-distance value for said corresponding sub-pixel; and
   a bit flag field containing a bit indicating whether said corresponding sub-pixel's color value is used in said computation of said averaged color value.

17. The system of claim 9, wherein said second buffer comprises:
   a single Z-distance field for said cluster of sub-pixel data, said Z-distance field containing a Z-distance value for said edge pixel;
   a color data field for each of said sub-pixels in said cluster of sub-pixel data, said color data field containing a color value for a corresponding sub-pixel; and
   a bit flag mask field for said cluster of sub-pixel data, said bit flag mask field containing a number of bits equaling said number of sub-pixels in said cluster, said bits indicating whether color values of corresponding sub-pixels are used in said computation of said averaged color value or whether said color value of said background is used in said computation of said averaged color value.

18. The system of claim 1, wherein said first and second buffers are integrated into a single physical memory unit.

19. The system of claim 1, wherein said first and second buffers are separate physical memory units.

20. The system of claim 1, wherein said first and second buffers are contained within a physical memory unit used by a host central processing unit.

21. The system of claim 1, wherein said first and second buffers are contained within a physical memory unit separate from a physical memory unit used by a host central processing unit.

22. The system of claim 1, wherein said polygon rendering system comprises an application specific integrated circuit, field-programmable gate array, digital signal processor, or an integrated circuit.

23. The system of claim 1, wherein said output circuitry comprises a video signal generator connected to a display monitor.

24. The system of claim 1, wherein said output circuitry is a printer.

25. A rasterizer unit, said rasterizer unit configured to:
   render geometric data as pixel data, said geometric data defining a polygon in an image being generated, said pixel data defining pixels used to display said image; and
   identify an edge pixel located on an edge of said polygon;
   wherein said pixel data corresponding to said geometric data is stored in a first buffer, said first memory buffer comprising at least three data fields for each of said pixels, said three data fields including a bit flag field containing a hi-res bit flag indicating whether said field's corresponding pixel is one of said edge pixels, a color data field containing a color value for said corresponding pixel, and a Z-distance field containing a Z-distance value for said corresponding pixel; and
   wherein, when said rasterizer unit identifies said edge pixel, said rasterizer unit outputs data that signals a display controller to allocate memory to a second memory buffer for storage of additional pixel data used to render said edge pixel at a higher resolution than pixels that are not said edge pixels, write a memory offset value indicating an address of said additional pixel data corresponding to said edge pixel in said second memory buffer in a data field corresponding to said edge pixel in said first memory buffer, and update contents of said first memory buffer with data based on contents of said second memory buffer.

26. The rasterizer unit of claim 25, wherein said first and second buffers are integrated into a single physical memory unit.

27. The rasterizer unit of claim 25, wherein said first and second buffers are separate physical memory units.

28. The rasterizer unit of claim 25, wherein said first and second buffers are contained within a physical memory unit used by a host central processing unit.

29. The rasterizer unit of claim 25, wherein said first and second buffers are contained within a physical memory unit separate from a physical memory unit used by a host central processing unit.

30. The rasterizer unit of claim 25, wherein said rasterizer unit is a discrete component.

31. The rasterizer unit of claim 30, wherein said discrete component is an application specific integrated circuit, field-programmable gate array, digital signal processor, or an integrated circuit.

32. The rasterizer unit of claim 25, wherein said rasterizer unit is integrated in a polygon rendering system.

33. The rasterizer unit of claim 32, wherein said polygon rendering system is a discrete component.

34. The rasterizer unit of claim 33, wherein said polygon rendering system is an application specific integrated circuit, field-programmable gate array, digital signal processor, or an integrated circuit.

35. The rasterizer unit of claim 25, wherein said rasterizer unit comprises a bit flag cache having a memory location to store a bit flag corresponding to each pixel in said image; and
   said rasterizer unit stores a hi-res bit flag value in said bit flag cache for each pixel in said image, said hi-res bit flag indicating whether said pixel is an edge pixel.

* * * * *